No. 702,008. Patented June 10, 1902.
A. JOHNSON.
OIL BURNER.
(Application filed Apr. 18, 1901.)
(No Model.)
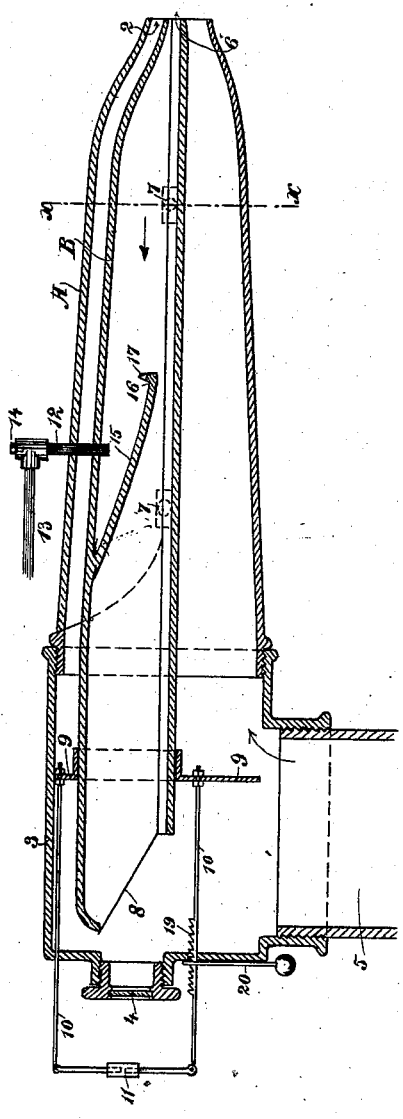
Fig. 1.
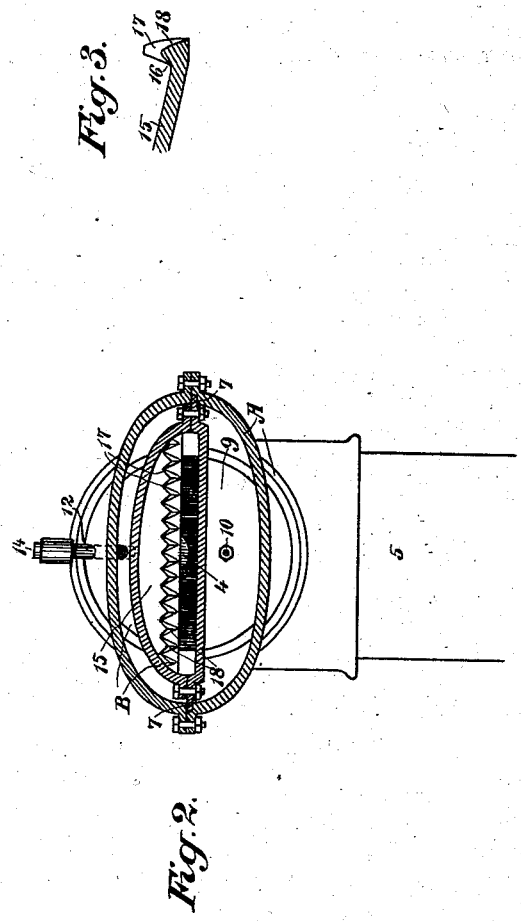
Fig. 3.
Fig. 2.
Witnesses,
Inventor,
August Johnson
By Dewey Strong & Co.
Attys

UNITED STATES PATENT OFFICE.

AUGUST JOHNSON, OF SAN FRANCISCO, CALIFORNIA.

OIL-BURNER.

SPECIFICATION forming part of Letters Patent No. 702,008, dated June 10, 1902.

Application filed April 13, 1901. Serial No. 55,646. (No model.)

*To all whom it may concern:*

Be it known that I, AUGUST JOHNSON, a citizen of the United States, residing in the city and county of San Francisco, State of California, have invented an Improvement in Oil-Burners; and I hereby declare the following to be a full, clear, and exact description of the same.

My invention relates to improved apparatus for the combustion of oil to be used especially in furnaces and like heating devices.

It consists of the construction and combination of parts hereinafter described and claimed.

Figure 1 is a longitudinal central section through the burner. Fig. 2 is a cross-section of the same on line $x\,x$ of Fig. 1 looking in the direction of the arrow. Fig. 3 is a section of the plate on which the oil is delivered.

The burner consists of an exterior tube A and an interior tube B. The exterior tube has a flattened lateral opening made in the front by closing the upper and lower portions of the tube toward each other and extending them out transversely, as shown at 2. Rearwardly the tube becomes gradually cylindrical in cross-section and is adapted to screw or be otherwise connected to a T, as at 3. The rear end has an opening which is essentially in line with the central portion of the apparatus and which is provided with a glazed or other transparent covering 4, through which the interior of the apparatus may be inspected, and particularly for the purpose of determining whether the distributer is level or is distributing the oil in proper manner within the tube. The lower branch of the T is connected with any source of air-supply, as at 5, and through this a blast of air is delivered into the T and thence passes forward into the remainder of the apparatus.

The inner tube B is here shown as segmental in form, the upper half coinciding approximately with the curvature of the upper part of the outer tube A, while the lower part is essentially flat. This inner section has also a flattened transversely-elongated discharge-opening mouth at the front, as shown at 6, and this mouth is interior to and approximately coincident with the mouth of the outer tube, as shown. The inner tube is suitably supported within the outer tube and may be held in place by means of lugs, as at 7, extending into corresponding seats in the outer tube, and the latter tube may be made in two parts, so that when the upper part is removed the interior tube B can be set in place, and its lugs may be clamped when the upper part of the outer tube is secured to the lower part, which is done by bolts or screws or in any suitable or desired manner. The rear end has its lower portion cut away in an angular manner, as shown at 8, so that this angular opening stands approximately in line above the rear half of the inlet opening or pipe 5, so that when air is delivered into the apparatus a portion of it passes directly into the inner tube, thence through its discharge-mouth, and a portion is delivered into the outer tube and passes around the inner tube. A slidable damper 9 surrounds the inner tube and is connected by rods 10 with a handle, as at 11, by which the damper can be moved forward or back, the rods sliding through appropriate openings in the rear of the T, and when the damper is moved the amount of air admitted to the outer tube can be regulated with relation to that which is admitted to the inner tube. Notches 19 are made in one of the rods 10 and a weighted link 20 hangs from either notch close to the point where the rod passes into the chamber, so that it acts as a stop to prevent the air-draft from moving the damper. By disengaging the stop any adjustment of the damper may be made.

The oil is delivered into the inner tube through a pipe 12, arriving by any suitable conduit, as at 13. The tube 12 is here shown as extending vertically through the upper part of both of the tubes A and B, and it has a removable plug, as at 14, in line with it, so that by the removal of the plug the interior of the pipe can be cleaned or inspected at will. The oil flowing from this pipe is delivered into a plate 15, the rear edge of which is secured to the inner upper surface of the tube B. From this point of attachment the plate is curved to form a concaved upper surface and at the front end is upturned, as shown at 16, so that the upturned front serves to arrest the oil which flows down this surface and to form a reservoir or storage for the distributer. The upturned edge 16 has serrations or notches formed upon it, as at 17, and these notches allow the oil to flow out through them, the bottoms of the notches being kept approximately level, so that the flow will be the same through each of them. From the front of these notches the tapering channels 18 extend down the inclined outer front of the upturned portion 16, as is well shown in the transverse section, Figs. 2 and 3. These tapering channels become deepest where they connect with the V-shaped notches 17 and gradually become more shallow, disappearing at a point above the bottom of the upturned fronts 16. The object of these notches and channels is to provide for a more perfect distribution of the oil and its delivery into the path of the air-blast in a thin and continuous sheet. This is effected as follows: The oil supplied into the concaved distributing-plate 15 flows down to the upturned front 16 and passing out through the notches 17 across this front is received into the channels 18. The upper ends of these channels are sufficiently deep to receive and hold all the oil which flows from the notches; but as they become shallower and narrower from this point until they disappear in the surface the oil must overflow from these channels and spread out over the intermediate surface between the channels, so that when it reaches the lower edge of the front 16 it will fall therefrom in a perfect sheet, and being there caught by the air-blast is discharged through the front opening 6, from which it is ejected. At this point the additional air delivered from the pipe A above and below the pipe B mingles with the discharge from the inner pipe and by the peculiar curvature of the discharge-passages the mixed sheet of vaporized oil and air is so discharged as to produce a very perfect combustion.

Having thus described my invention, what I claim as new, and desire to secure by Letters Patent, is—

1. In an oil-burner, the combination with burner-tubes, an air-supply, and a fuel-feed pipe, of an inclined oil-distributing plate disposed below the discharge end of the feed-pipe and having its lower edge turned upward to arrest the flow of oil and form a shallow reservoir and the upper portion of said upturned portion having notches with channels leading therefrom down the outer front of the upturned portion.

2. In an oil-burner the combination with burner-tubes, an air-supply, and a fuel-feed pipe, of an inclined oil-distributing plate disposed below the said pipe and receiving the oil therefrom said plate being concaved in the direction of its length and having its lower edge upturned to arrest the oil and form a shallow reservoir which extends transversely across the front end of the plate, and the upper edge of said upturned portion of the plate having notches with tapering channels extending from the bottom of the notches down the outer front of the upturned edge and made deepest at the base of the notches and becoming more shallow and disappearing at a point above the bottom edge of said upturned portion.

3. The combination in an oil-burner of an exterior air and an interior air and oil pipe, means for supplying and regulating the flow of air through the two pipes, flattened horizontal elongated discharge-mouths for the two pipes approximately in the same vertical plane, an oil-supply pipe leading into the inner burner-pipe at the rear of the discharge-mouth, a declining plate upon which the oil is delivered, said plate having an upturned front with notches formed therethrough, channels connecting with each of said notches extending down the outer front of the upturned portion, said channels having the greatest depth at their junction with the notches and disappearing on the surface-level at points above the bottom of the plate.

In witness whereof I have hereunto set my hand.

AUGUST JOHNSON.

Witnesses:
S. H. NOURSE,
JESSIE C. BRODIE.